US006552318B1

(12) United States Patent
Crowther et al.

(10) Patent No.: US 6,552,318 B1
(45) Date of Patent: Apr. 22, 2003

(54) SENSOR SYSTEM WITH RIGID-BODY ERROR CORRECTING ELEMENT

(75) Inventors: Blake G. Crowther, Logan, UT (US); Dean B. McKenney, Ormond Beach, FL (US); Scott W. Sparrold, Tucson, AZ (US); Michael R. Whalen, Santa Barbara, CA (US); James P. Mills, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/337,816

(22) Filed: Jun. 22, 1999

(51) Int. Cl.[7] ................................................. G01J 1/20
(52) U.S. Cl. ................................................. 250/201.9
(58) Field of Search ...................... 250/201.9; 356/121; 359/846, 849, 900

(56) References Cited

U.S. PATENT DOCUMENTS

| 4,773,748 | A | * | 9/1988 | Shih et al. ..................... 355/52 |
| 4,902,100 | A | * | 2/1990 | Reynolds et al. ............. 359/12 |
| 5,220,159 | A | * | 6/1993 | Friedenthal ............... 250/201.9 |
| 5,526,181 | A | * | 6/1996 | Kunick et al. .............. 244/3.16 |
| 5,946,143 | A | * | 8/1999 | Whalen ....................... 359/711 |
| 6,018,424 | A | * | 1/2000 | Morgan et al. ............. 359/234 |
| 6,028,712 | A | | 2/2000 | McKenney et al. |
| 6,091,548 | A | * | 7/2000 | Chen .......................... 359/637 |
| 6,201,230 | B1 | | 3/2001 | Crowther et al. |

* cited by examiner

Primary Examiner—Zandra Smith
(74) Attorney, Agent, or Firm—Colin M. Raufer; Leonard A. Alkov; Glenn H. Lenzen, Jr.

(57) ABSTRACT

A sensor system includes a sensor, and an optical train adjustable to provide an optical beam to the sensor from a selected line of sight that may be varied. The optical train includes a wavefront error-introducing element in the optical train, which introduces a wavefront error that is a function of the selected line of sight. There is further a rigid-body wavefront error-correcting element in the optical train. The rigid-body wavefront error-correcting element has a spatially dependent correction structure with the nature of the correction being a function of the selected line of sight. The adjustment of the optical train to the selected line of sight moves the optical beam to the appropriate location of the rigid-body wavefront error-correcting element to correct for the corresponding introduced wavefront error of the wavefront error-introducing element at that selected line of sight.

18 Claims, 5 Drawing Sheets

SENSOR SYSTEM WITH RIGID-BODY ERROR CORRECTING ELEMENT

BACKGROUND OF THE INVENTION

This invention relates to sensor systems, and, more particularly, to a sensor system wherein an angularly dependent introduced error is corrected by a rigid body error-correcting element.

Optical sensors are used in aircraft and missile applications to receive radiated optical energy from a scene and convert the energy to an electrical signal. The electrical signal is provided to a display or further processed for pattern recognition or the like. The optical sensor and its related optical train, termed a sensor system, are usually packaged in a housing. The housing may be pivotably mounted within the airframe to allow the optical sensor to be pointed toward subjects of interest.

The sensor system is rather fragile and is easily damaged by dirt, erosion, chemicals, or high air velocity. The sensor system is therefore placed behind a window through which the sensor views the scene and which protects the sensor system from such external agents. The window must be transparent to the radiation of the operating wavelength of the sensor, resist attack from the external forces, and introduce minimal or correctable wavefront errors into the image received by the sensor.

For many applications such as low-speed aircraft and helicopters, the window may be spherical, with the sensor focal point placed at the center of the sphere to minimize gimbal angle-dependent bore sight and wavefront errors. However, in higher speed aircraft and missiles the spherical window is unsatisfactory, as it induces a great deal of aerodynamic drag that reduces the maximum speed and range of the vehicle. An elongated, relatively narrow window, termed a conformal window, is therefore preferred for use in high-speed applications to reduce the aerodynamic drag.

The nonspherical conformal window, while reducing aerodynamic drag, introduces wavefront errors into the optical beam which are dependent upon the angle of the line of sight of the sensor. These wavefront errors may lead to angularly dependent errors in identification and location of features in the field of regard of the sensor. Techniques exist for mathematically processing the sensor signal to reduce the impact of such introduced wavefront errors, but these techniques utilize large amounts of computer processing capability.

There is a need for an improved approach to sensor systems used with conformal windows and other wavefront error-introducing elements. Such an improved approach would reduce and, ideally, eliminate such wavefront errors of the optical beam reaching the sensor. The present invention fulfills this need, and further provides related advantages.

SUMMARY OF THE INVENTION

The present invention provides a sensor system that corrects known wavefront errors introduced by elements in the optical train such as conformal windows. The error correction is achieved in a passive manner, without the addition of any motor drives and without the use of computer processing of the sensor signal. The correction is tailored to the particular error-introducing element, and does not require any change in the basic optical system or motion control system. The present approach allows the use of further processing of the sensor signal to achieve further correction.

In accordance with the invention, a sensor system comprises a sensor, and an optical train adjustable to provide an optical beam to the sensor from a selected line of sight selected from any of a plurality of lines of sight. The optical train includes a wavefront error-introducing element in the optical train, such as a conformal window. The nature of the introduced error is a function of the selected line of sight. The optical train also includes a rigid-body wavefront error-correcting element in the optical train, which may be a refractive element or a reflective element. The rigid-body wavefront error-correcting element has a spatially dependent correction structure, with the nature of the correction being a function of the selected line of sight. The adjustment of the optical train to the selected line of sight moves the optical beam to the appropriate location of the rigid-body wavefront error-correcting element to correct for the corresponding introduced wavefront error of the wavefront error-introducing element at that selected line of sight.

In another aspect, a sensor system comprises a sensor, and an optical train that directs an optical beam from an external location to the sensor. The optical train comprises a wavefront error-introducing element having a plurality of wavefront error-introducing locations, with a known wavefront error associated with each selected wavefront error-introducing location. A rigid-body wavefront error-correcting element has a plurality of wavefront-correcting locations, with a known wavefront correction associated with each selected wavefront-correction location. A known wavefront correction location on the wavefront error-correction element corresponds to each known wavefront error at each selected wavefront error-introducing location. An optical beam-director element controllably directs the optical beam from the external location, through the known wavefront error-introducing location, through the known wavefront-correction location, and thence to the sensor. The passage of the optical beam through the wavefront correction location partially or completely corrects the error introduced by the passage through the error-introducing location.

The rigid-body wavefront error-correcting element may be fixed with respect to the wavefront error-introducing element. In another form of the invention, the wavefront error-correcting element may be affixed to the optical beam-director element or other movable element so as to achieve a coordinated movement of the wavefront error-correcting element with the changing of the line of sight of the optical train. In either case, the corrections required to correct the errors introduced by the error-introducing element as a function of the line of sight angular position are utilized in constructing the error-correcting element. The structure of the error-correcting element varies according to location, to correspond to the corrections required for each associated line of sight of the optical train.

Ideally, the wavefront error-correcting element completely corrects and negates the errors introduced by the wavefront error-introducing element. A complete correction may not be possible in all cases. Remaining errors may be corrected by mathematical processing of the sensor image signal or other techniques, as appropriate.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4B illustrates design considerations for the wavefront error-correcting element, and FIG. 4C illustrates results obtained with this approach;

DETAILED DESCRIPTION OF THE INVENTION

Figure 1A:
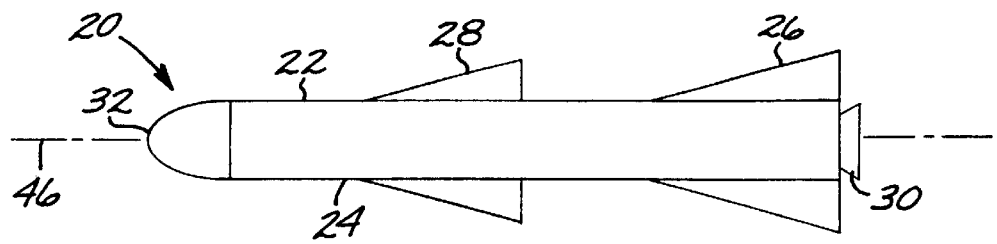
FIG. 1A is an elevational view of an unmanned missile.
Figure 1B:
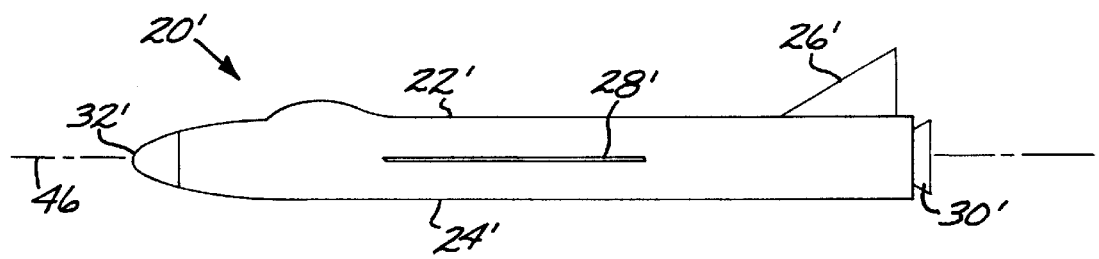
FIG. 1B is an elevational view of a manned aircraft.

The present invention is preferably utilized in conjunction with a sensor system used on a flight vehicle such as an unmanned missile 20 of FIG. 1A. The missile 20 has an airframe 22, including in this case a fuselage 24, tail fins 26, and guidance fins 28. A rocket motor 30 is positioned in a tail of the fuselage 24. At a forward end of the fuselage 24 and supported on the airframe 22 is a forward-facing window 32 through which a sensor system views an external scene. In this case, the window 32 is a conformal window having an ogival shape, but which could also be conical or other shape. FIG. 1B illustrates a manned aircraft 20' having similar elements, including a fuselage 24', a tail 26', wings 28', a jet engine 30', and a forward-facing conformal window 32'. The preferred application of the present invention is on the missile 20, and the following discussion will be directed toward such a missile. The invention is not limited to the missile, but is equally applicable to the aircraft 20' and other operable structures.

Figure 2:
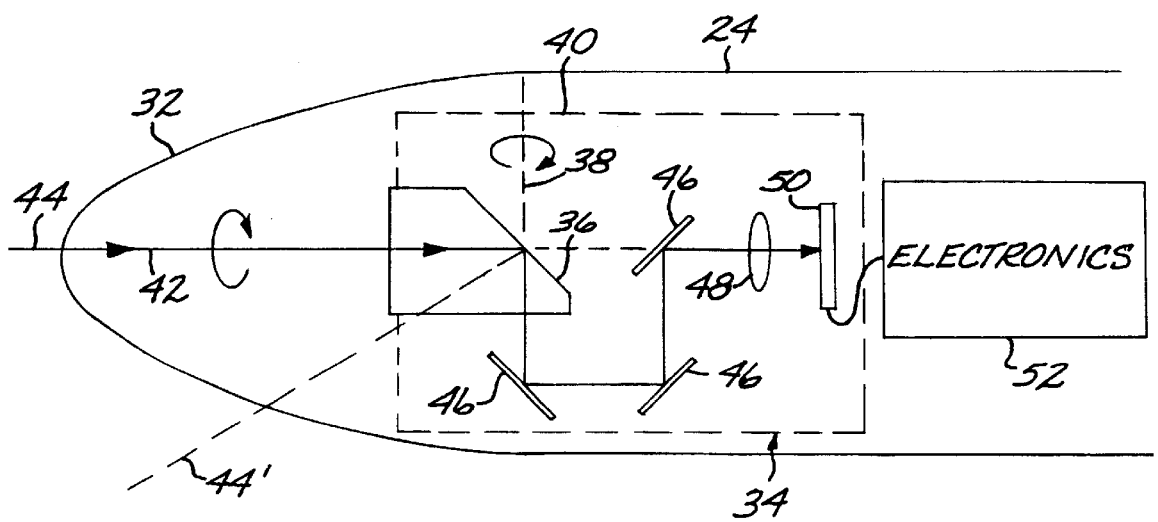
FIG. 2 is a schematic sectional view of the conformal window and a sensor system positioned in relation to the conformal window.

FIG. 2 presents an interior view of the nose of the missile 20, with a gimbaled sensor system 34 schematically shown. The illustrated sensor system is the baseline sensor system with which the other present invention is preferably used, in this case utilizing a roll/nod gimbal system. However, the invention may be used with other types of operable sensor systems and gimbal systems, as well. The sensor system 34 includes a nod mirror 36 which pivots horizontally about a nod axis 38. The entire sensor system 34 is supported in a roll gimbal 40 which pivots about a roll axis 42. The combination of the-rotations about the nod axis 38 and the roll axis 42 allows a full forward-looking field of regard of the sensor system 34. A light beam 44 (typically either visible or infrared light) passes through the window 32, is reflected from the nod mirror 36 and planar mirrors 46, through focusing optics indicated schematically by a lens 48, and to a sensor 50. The light energy of the light beam 44 is converted to electrical signals, which are processed in electronics 52 for use in the guidance and targeting of the missile 20. Such baseline sensor systems are known in the art.

When the light beam 44 enters the system through the conformal window 32, it is aberrated somewhat by the passage through the window. (The terms "aberration" and "wavefront error" are synonymous as used herein.) The conformal window 32 therefore functions as a wavefront error-introducing element in the optical train of the sensor system 34. This introduced wavefront error arises because of the location-variable shape of the window, not because of any fault in the window, although faults may also be present and cause further aberration.

The wavefront error varies according to the line of sight along which the light beam 44 enters. That is, if the nod mirror 36 is rotated laterally to view a different light beam 44', the shape-based wavefront error is different than that experienced for the light beam 44. The wavefront error introduced into the light beam is therefore spatially dependent upon the location on the window 32 through which the light beam passes, and thence the line of sight along which the sensor system is aimed. The nature (both character and magnitude) of the introduced wavefront error as a function of location and angle of the line of sight may be measured for each wavefront error-introducing element using conventional optical measurement techniques, prior to the wavefront error-introducing element being placed into service. The conformal window is the wavefront error-introducing element of most interest to the inventors, because it is a concern for nearly all instances of advanced forward-facing sensor systems, but the present invention may be used in conjunction with other types of wavefront error-introducing elements as well.

According to the present invention, a passive rigid-body wavefront error-correcting element is placed into the optical train so that the light beam passes through or is reflected by the passive rigid-body wavefront error-correcting element either before or after it passes through the wavefront error-introducing element. The passive rigid-body is optically configured such that it corrects for the wavefront errors of the light beam introduced into the light beam by the wavefront error-introducing element, in this case the conformal window 32.

Figure 3:
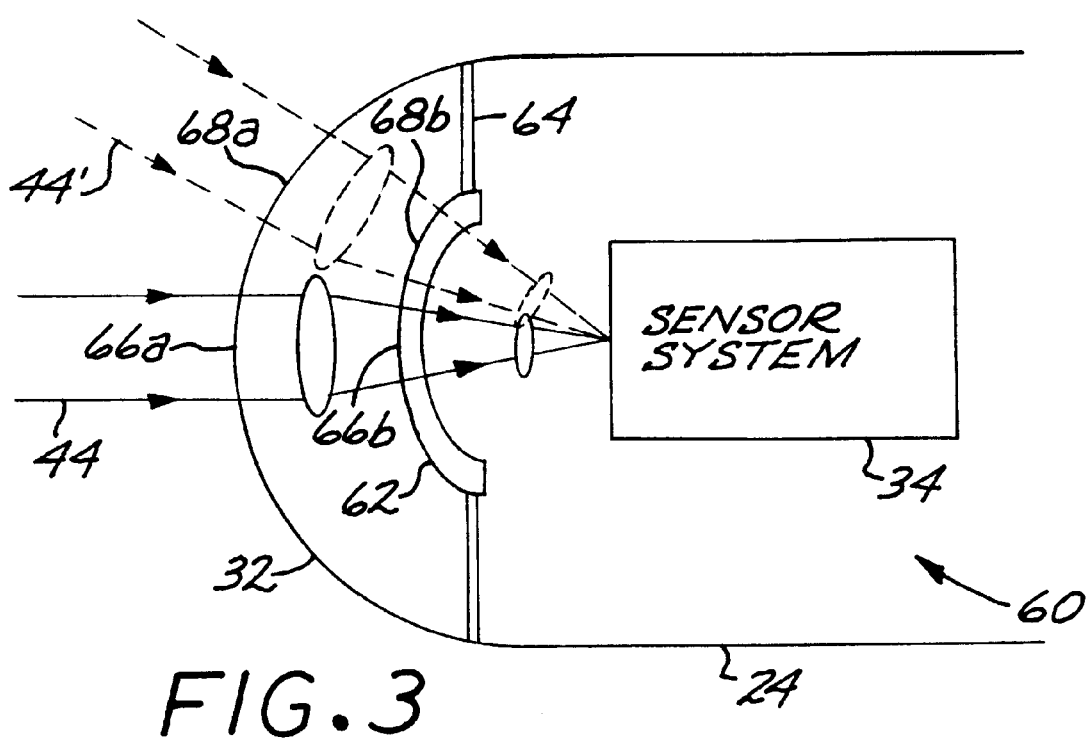
FIG. 3 is a schematic sectional view of a first embodiment of a passive rigid-body wavefront error-correcting element in the optical train of the sensor system.

FIG. 3 illustrates one embodiment of an optical train 60 with light beams 44 and 44' directed through the window 32 and into the sensor system 34. The light beam 44 is sensed with the sensor system in one orientation, and the light beam 44' is sensed with the sensor system in a different orientation. The wavefront error introduced into the light beam by its passage through the conformal window 32 is angularly dependent, so that the wavefront error of the light beam 44 is different from that of the light beam 44'. A passive rigid-body wavefront error-correcting element 62 is positioned so that the light beams 44 and 44' intercept it. In this case, the wavefront error-correcting element 62 is a refractive element, so that the light beams pass through it. The wavefront error-correcting element is affixed to the fuselage 24 or the window 32 by a support 64, and accordingly is fixed and does not move relative to the wavefront error-introducing element, in this case the window 32.

The wavefront error-correcting element 62 is optically fabricated at each location such that the light beam passing through the corresponding location of the wavefront error-introducing element, the window 32, is corrected. Referring to FIG. 3, the light beam 44 passes through a location 66a of the window 32, a location 66b of the wavefront error-correcting element 62, and to the sensor system 34. The wavefront error introduced by the passage of the light beam 44 through the location 66a is measured in the initial assessment of the window 32. The location 66b of the wavefront error-correcting element 62 is fabricated to effect the appropriate correction of the wavefront error. Similarly, the light beam 44' passes through a location 68a of the window 32, a location 68b of the wavefront error-correcting element 62, and to the sensor system 34. The wavefront error introduced by the passage of the light beam 44' through the location 68a, which in general is different from the wavefront error introduced by the passage of the light beam 44 through the location 66a, is measured in the initial assessment of the window 32. The location 68b of the wavefront error-correcting element 62 is fabricated to effect the appropriate correction of that wavefront error. The entire wavefront error-correcting element 62 is fabricated in a similar fashion to achieve a location-by-location correction structure. This correction structure is specific to the window 32, and differs for a window of another shape. Accordingly, no general form of correction structure can be specified herein.

Figure 4A:
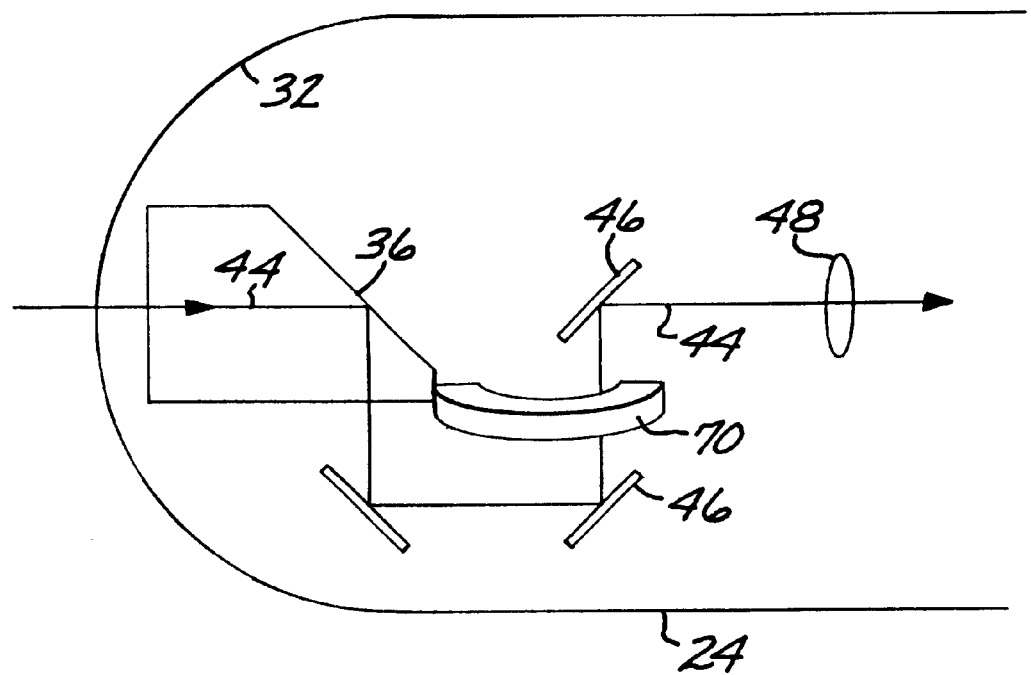
FIGS. 4A–4C illustrate the structure and results obtained with a second embodiment, wherein FIG. 4A schematically depicts a portion of the optical train of the sensor system with the passive rigid-body wavefront error-correcting element in position.
Figures 4B, 4C:
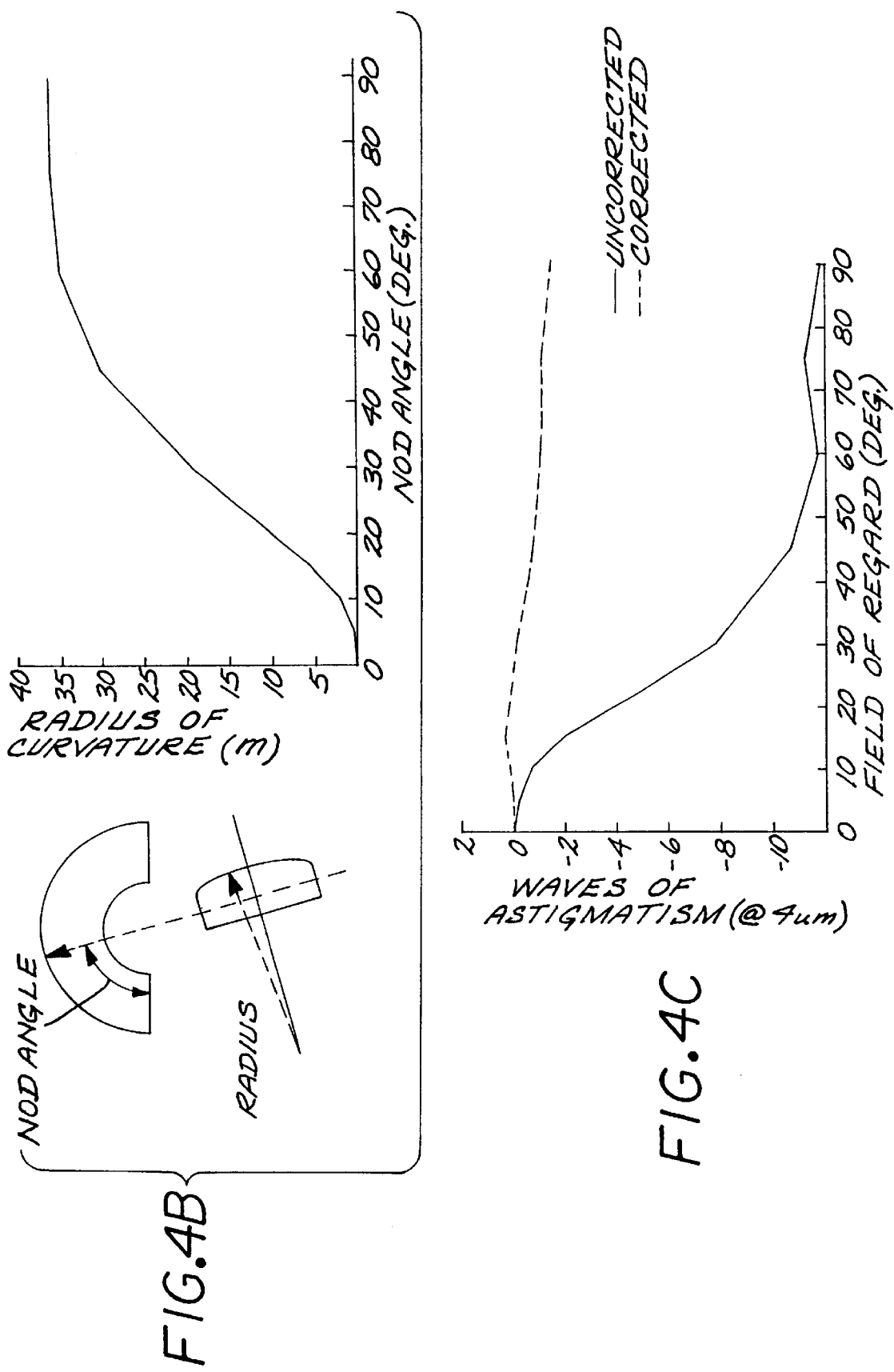

FIGS. 4A–4C illustrate another embodiment of the invention and its use to correct the wavefront error introduced by the window 32. FIG. 4A illustrates a portion of the optical train described and illustrated in relation to FIG. 2, which discussion is incorporated here. A rigid-body wavefront error-correcting element 70, shown in greater detail in the inset to FIG. 4A, is affixed to the roll and nod gimbal structure, so that it moves with respect to -the window 32 as the gimbal operates. As with any of the movable error-correcting elements, the element 70 may be moved with a gear or linkage that provides specific types and rates of movement relative to the support upon which it is based. Specifically, in this case the element 70 is affixed to the gimbal for the nod mirror 36, and therefore moves relative to the window 32 as the nod mirror rotates. As the nod mirror 36 is rotated about the nod axis 38, the wavefront error-correcting element 70 sweeps through the light beam 44.

The wavefront error-correcting element 70 of FIG. 4A is fabricated with a correction structure using the same general approach as described previously in relation to the embodiment of FIG. 3, which discussion is incorporated here. In a specific case studied, the local surface figure of the element 70 was cylindrical, where the cylinder radius varied as a function of nod angle of rotation about the nod axis 38. FIG. 4B illustrates the determination of the radius of curvature as a function of the nod angle for a specific case of an aspheric conformal window. These shapes are established by first measuring the wavefront error introduced by the wavefront error-introducing element, or utilizing optical design codes to calculate the wavefront error of ray paths of light passing through regions of the wavefront error-introducing element. Once the introduced wavefront error is known as a function of location and pointing angle, the corresponding correction required in the wavefront error-correcting element to minimize the wavefront error of an image viewed through the window is determined using optical design codes that are well known in the art for other applications. See, for example, Donald P. Feder, "Automatic Lens Design Methods," *J. Optical Society of America*, vol. 47, No. 10 (1957), pages 902–912, and G. W. Forbes, "Optical system assessment for design: numeral ray tracing in the Gaussian pupil," *J. Optical Society of America A*, Vol. 5, No. 11 (1988), pages 1943–1956. Examples of commercially available optical design codes include "Code V" by Optical Research Associates, "OSLO" by Sinclair Optics, and "ZEMAX" by Focus Software.

FIG. 4C illustrates results obtained for the correction of third order astigmatism as a function of the nod angle using the embodiment of FIG. 4A, with uncorrected data presented for comparison. The present approach corrects for most of the third order astigmatism. If the remaining third order astigmatism is troublesome, it may be corrected by other means such as numerical analysis of the output signal of the sensor system 34.

Figure 5:
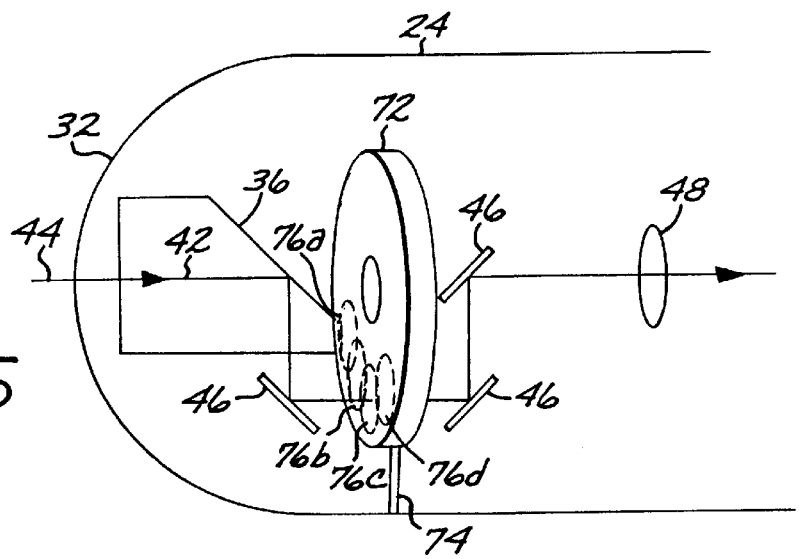
FIG. 5 schematically illustrates a third embodiment of the optical train and passive rigid-body wavefront error-correcting element.

FIG. 5 illustrates another embodiment of a wavefront error-correcting element 72, in relation to a portion of the sensor system 34 as shown and described in relation to FIG. 2, which discussion is incorporated here. The wavefront error-correcting element 72 is rigidly and fixedly supported from the fuselage 24 by a support 74, so that it does not move relative to the window 32. The wavefront error-correcting element 72 of FIG. 5 is fabricated with a correction structure using the same general approach as described previously in relation to the embodiment of FIGS. 3 and 4, which discussion is incorporated here. In this case, the fabricated correction on the wavefront error-correcting element 72 varies circumferentially, as indicated by different optical structures at locations 76a, 76b, 76c, 76d, etc. Thus, as the optical system rotates about the roll axis 42, the light beam 44 passes through the different locations 76a, 76b, 76c, 76d, etc., with differing optical wavefront corrections.

The approaches of FIGS. 4 and 5 may be combined to provide a correction for both nodding wavefront errors (FIG. 4) and for roll wavefront errors (FIG. 5).

Figure 6A:
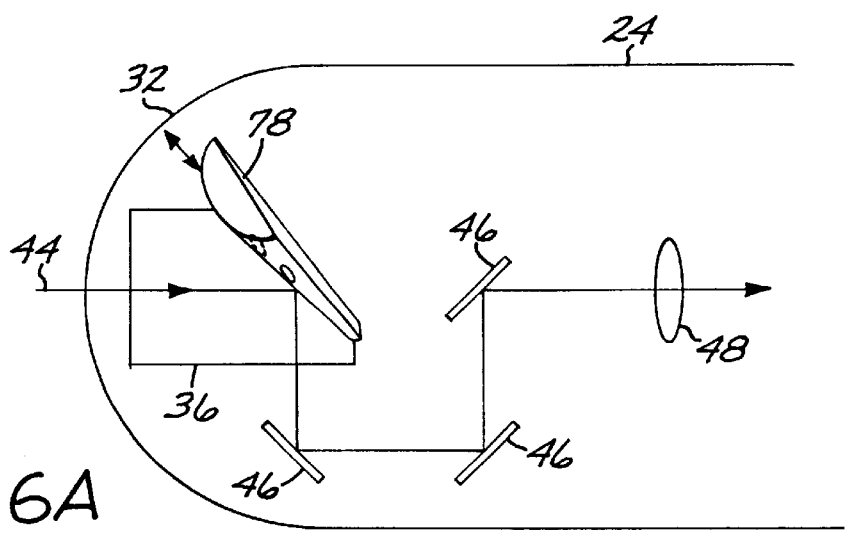
FIGS. 6A–6B schematically illustrate a fourth and fifth embodiment of the optical train and the passive rigid-body wavefront error-correcting element.
Figure 6B:
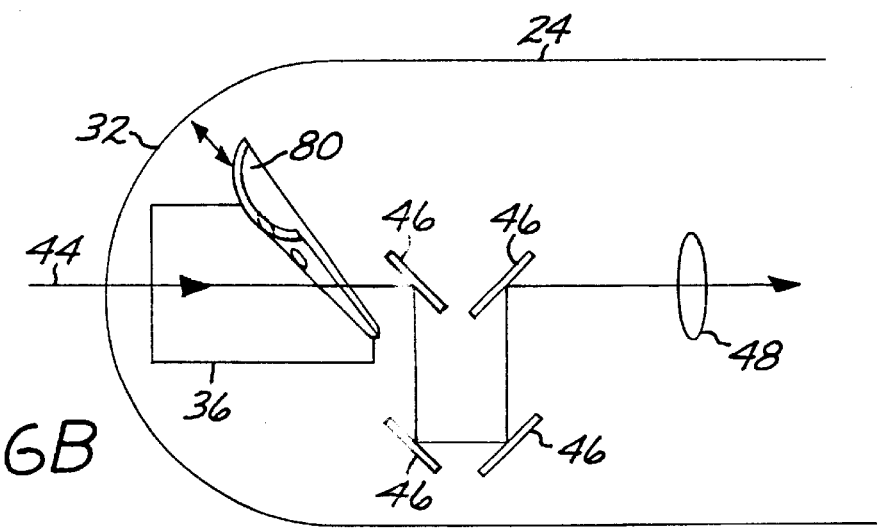

FIGS. 6A–6B illustrate two embodiments in relation to a portion of the sensor system 34 as shown and described in relation to FIG. 2, which discussion is incorporated here. In each of these cases, a wavefront error-correcting element 78 (FIG. 6A) and a wavefront error-correcting element 80 (FIG. 6B) are supported from the roll gimbal (not the nod mirror or gimbal). The elements 78 and 80 are conical or truncated conical in shape. The wavefront error-correcting elements 78 of FIG. 6A and element 80 of FIG. 6B are fabricated with a correction structure using the same general approach as described previously in relation to the embodiments of FIGS. 3–4, which discussion is incorporated here. The wavefront error-correcting element 78 is reflective (i.e., a mirror), while the wavefront error-correcting element 80 is refractive (i.e., a lens). In each case, as the nod mirror 36 rotates about the nod axis 38, different regions of the elements 78 and 80 are brought into the beam 44, effecting correction in the manner described previously. Either of the elements 78 and 80 may optionally be laterally translated, if desired.

Figure 7:
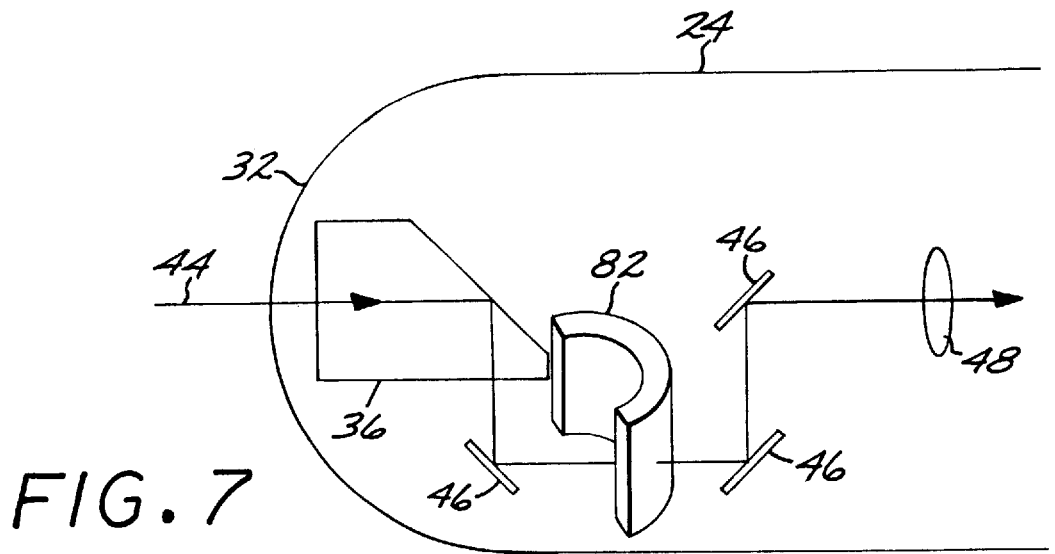
FIG. 7 schematically illustrates a sixth embodiment of the optical train and passive rigid-body wavefront error-correcting element.

FIG. 7 illustrates another embodiment in relation to a portion of the sensor system 34 as shown and described in relation to FIG. 2, which discussion is incorporated here. A wavefront error-correcting element 82 is supported so as to rotate with the nod mirror 36, about the nod axis 38. The element 82 is a conical refractive element. The wavefront error-correcting element 82 is ground with a correction structure using the same general approach as described previously in relation to the embodiments of FIGS. 3–4, which discussion is incorporated here.

Figure 8:
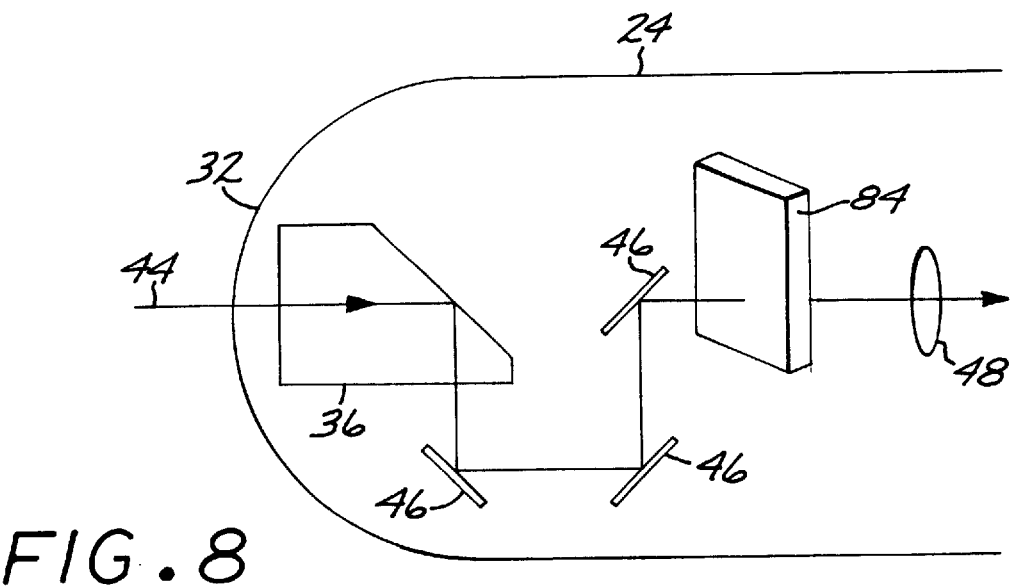
FIG. 8 schematically illustrates a seventh embodiment of the optical train and passive rigid-body wavefront error-correcting element.

FIG. 8 illustrates an embodiment in relation to a portion of the sensor system 34 as shown and described in relation to FIG. 2, which discussion is incorporated here. A wavefront error-correcting element 84 is supported in the optical path of the light beam 44, and can be moved about in the optical path. The movement may be supplied, for example, by gearing or a linkage driven by the movement about the roll axis or the nod axis. The wavefront error-correcting element 84 is ground with a correction structure the same general approach as described previously in relation to the embodiments of FIGS. 3–4, which discussion is incorporated here.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sensor system, comprising:

a sensor; and an optical train adjustable to provide an optical beam to the sensor from a selected line of sight selected from any of a plurality of lines of sight, the optical train including a wavefront error-introducing element in the optical train, the nature of the introduced error being a function of the selected line of sight, and a rigid-body wavefront error-correcting element in the optical train, wherein the rigid-body wavefront error-correcting element is stationary with respect to the wavefront error-introducing element, wherein the rigid-body wavefront error-correcting element has a spatially dependent correction structure with the nature of the correction being a function of the selected line of sight, and wherein the adjustment of the optical train to the selected line of sight moves the optical beam to the appropriate location of the rigid-body wavefront error-correcting element to correct for the corresponding introduced wavefront error of the wavefront error-introducing element at that selected line of sight.

2. The sensor system of claim 1, wherein the wavefront error-introducing element comprises a window through which the line of sight extends.

3. The sensor system of claim 1, wherein the rigid-body wavefront error-correcting element is a refractive element.

4. The sensor system of claim 1, wherein the rigid-body wavefront error-correcting element is a reflective element.

5. The sensor system of claim 1, wherein the rigid-body wavefront error-correcting element is movable with respect to the wavefront error-introducing element.

6. A sensor system, comprising:

a sensor; and an optical train that directs an optical beam from an external location to the sensor, comprising:

a wavefront error-introducing element having a plurality of wavefront error-introducing locations, with a known wavefront error associated with each selected wavefront error-introducing location, a rigid-body wavefront error-correcting element having a plurality of wavefront-correcting locations, with a known wavefront correction associated with each selected wavefront-correction location, there being a respective known wavefront correction and a respective known wavefront correction location on the wavefront error-correction element for each known wavefront error and each selected wavefront error-introducing location, and an optical beam-director element operable to controllably direct the optical beam received from the external location, through the known wavefront error-introducing location, through the respective known wavefront-correction location, and thence to the sensor, wherein the optical beam-director element comprises a movable element, and wherein the wavefront error-correcting element is affixed to the movable element.

7. The sensor system of claim 6, wherein the wavefront error-correcting element is movable with respect to the wavefront error-introducing element.

8. The sensor system of claim 6, wherein the wavefront error-introducing element comprises a window through which the line of sight extends.

9. The sensor system of claim 6, wherein the rigid-body wavefront error-correcting element is a refractive element.

10. The sensor system of claim 6, wherein the rigid-body wavefront error-correcting element is a reflective element.

11. A sensor system, comprising:

a sensor; and an optical train that directs an optical beam from an external location to the sensor, comprising:

a wavefront error-introducing element having a plurality of wavefront error-introducing locations, with a known wavefront error associated with each selected wavefront error-introducing location, a rigid-body wavefront error-correcting element having a plurality of wavefront-correcting locations, with a known wavefront correction associated with each selected wavefront-correction location, there being a respective known wavefront correction and a respective known wavefront correction location on the wavefront error-correction element for each known wavefront error and each selected wavefront error-introducing location, wherein the wavefront error-correcting element is stationary with respect to the wavefront error-introducing element, and an optical beam-director element operable to controllably direct the optical beam received from the external location, through the known wavefront error-introducing location, through the respective known wavefront-correction location, and thence to the sensor.

12. The sensor system of claim 11, wherein the optical beam-director element comprises a movable element.

13. The sensor system of claim 12, wherein the wavefront error-correcting element is not affixed to the movable element.

14. A sensor system, comprising:

a window a sensor; and an optical train adjustable to provide an optical beam to the sensor from a selected line of sight selected from any of a plurality of lines of sight, the optical train including a first optical element that receives the optical beam after the optical beam passes through the window, the first optical element being movable with respect to the window, and a rigid-body wavefront error-correcting element in the optical train at a location between the first optical element and the sensor, wherein the rigid-body wavefront error-correcting element has a spatially dependent correction structure with the nature of the correction being a function of the selected line of sight, and wherein the adjustment of the optical train to the selected line of sight moves the optical beam to the appropriate location of the rigid-body wavefront error-correcting element to correct for the corresponding introduced wavefront error of the wavefront error-introducing element at that selected line of sight.

15. The sensor system of claim 14, wherein the first optical element is a nod mirror of a roll-nod gimbal system.

16. The sensor system of claim 14, wherein the rigid-body wavefront error-correcting element is a refractive element.

17. The sensor system of claim 14, wherein the rigid-body wavefront error-correcting element is a reflective element.

18. The sensor system of claim 14, wherein the rigid-body wavefront error-correcting element is movable with respect to the first optical element.

* * * * *